Sept. 14, 1965 R. R. MATOUSEK 3,205,780
CONVERSION MODULE FOR A MACHINE TOOL
Filed April 22, 1963 4 Sheets-Sheet 1
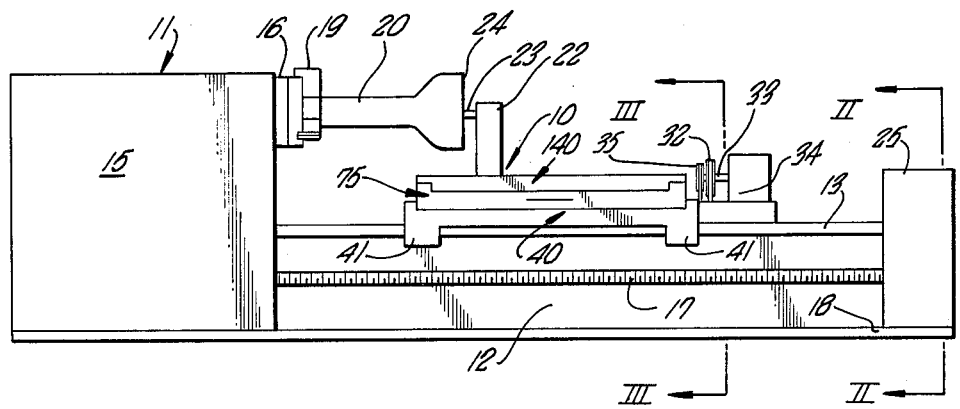
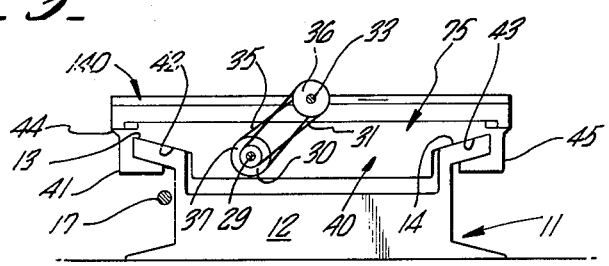
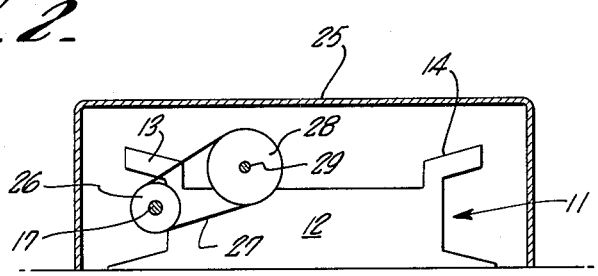
INVENTOR.
ROBERT R. MATOUSEK
BY
Christie, Parker & Hale
ATTORNEYS.

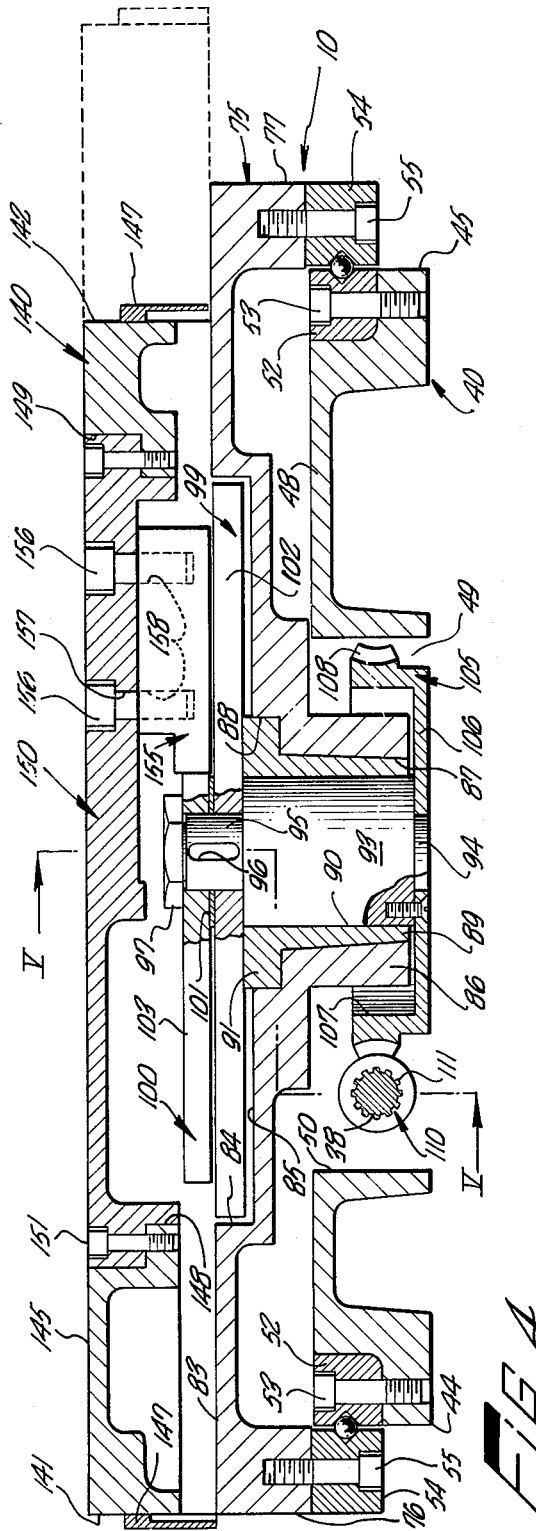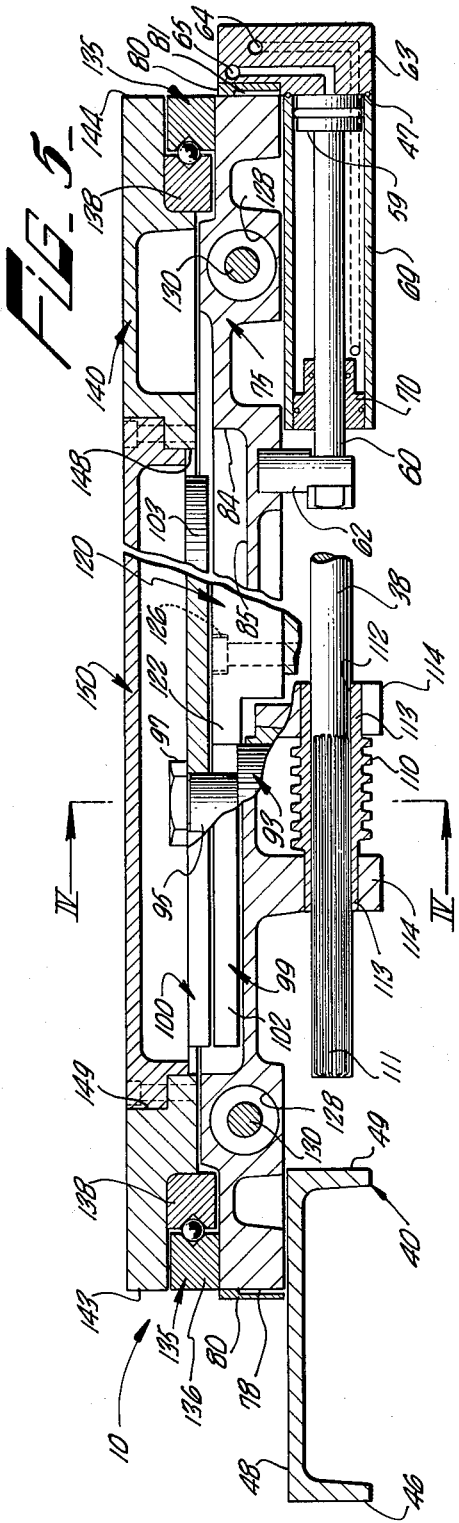

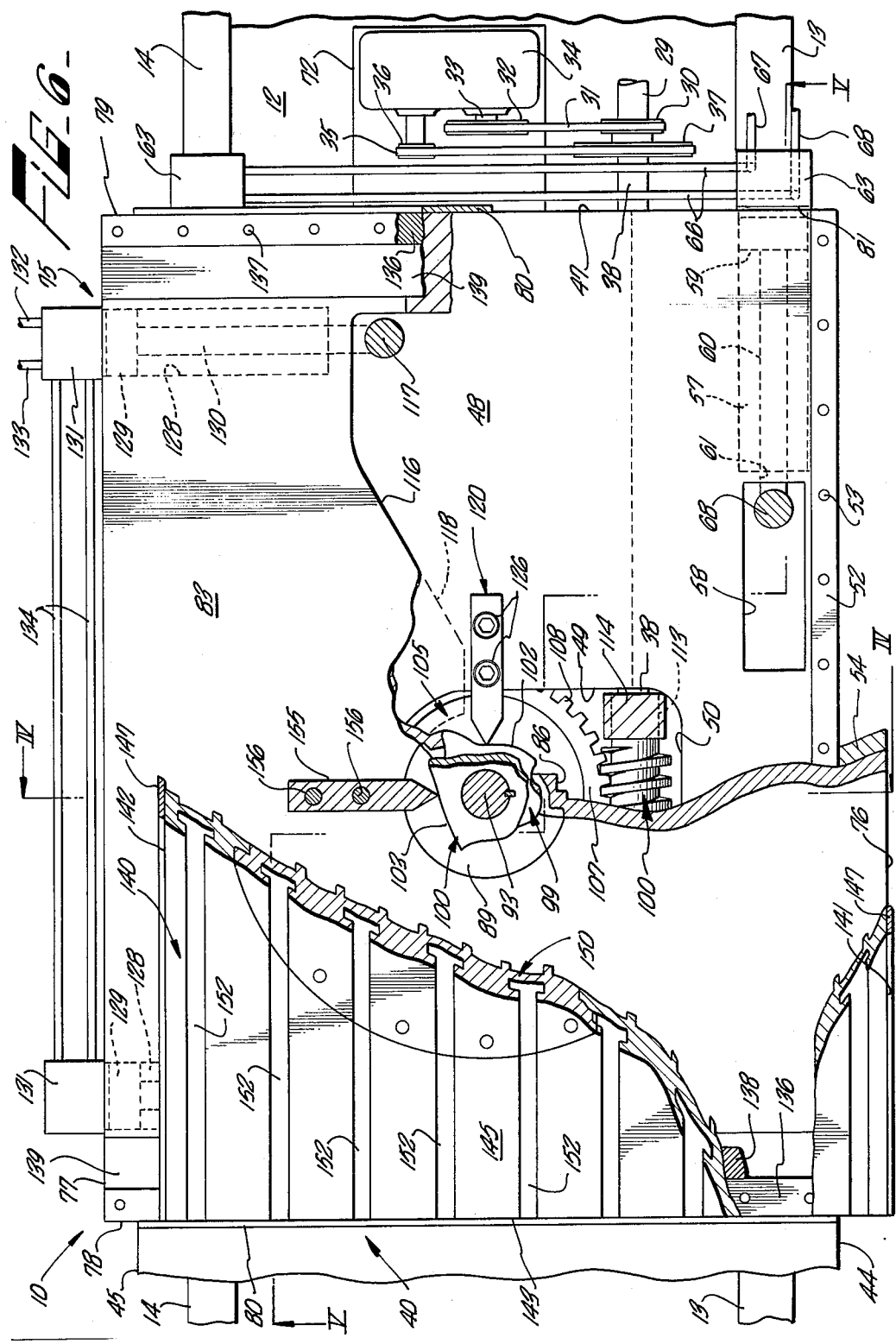

Sept. 14, 1965  R. R. MATOUSEK  3,205,780
CONVERSION MODULE FOR A MACHINE TOOL
Filed April 22, 1963  4 Sheets-Sheet 4

INVENTOR.
ROBERT R. MATOUSEK
BY
ATTORNEYS.

United States Patent Office 3,205,780
Patented Sept. 14, 1965

3,205,780
CONVERSION MODULE FOR A
MACHINE TOOL
Robert R. Matousek, 407 S. Union Drive,
Los Angeles 17, Calif.
Filed Apr. 22, 1963, Ser. No. 274,541
13 Claims. (Cl. 90—13)

This invention relates to contouring machines; more particularly, it relates to modular attachment apparatus for converting a conventional machine tool to a contouring tool.

This application is a continuation-in-part of my application for Letters Patent of the United States, Serial No. 161,488, filed Dec. 22, 1961, for an improvement in Automated Chucking Machine and now abandoned.

Application Serial No. 161,488 discloses and claims, as an entity, an improved chucking machine having a pair of slides mounted for concurrent rectilinear movement relative to the base of the machine in mutually perpendicular directions. One of the slides is mounted on the base of the machine for movement parallel to the axis of rotation of a chuck adapted for holding a workpiece. Mechanism is provided in the chucking machine which automatically actuates both slides concurrently with preselected and variable rates of displacement so that a tool holder, secured to one of the slides, moves along a preselected curve relative to the work piece. The preselected curve is derived from X and Y rectangular components of the preselected curve which components are programmed into a pair of cams. Each of the pair of slides is engaged with a corresponding cam so that the rectangular coordinates programmed into the cams are transferred on rotation of the cams into the rectilinear movements of the slides to reproduce the preselected curve.

This invention, as distinguished from the disclosure in my copending application, is directed a modular unit which is mountable to the bed of an existing machine tool such as a lathe, drill press, boring mill, milling machine and the like to convert the machine tool into a contouring machine. The present invention incorporates many of the principles of operation disclosed in application Serial No. 161,488.

Techniques for reconstructing a desired curve from rectilinear coordinates imposed upon a pair of rotating cams have been known. In the past, however, machines employing such techniques to contour a workpiece rely upon structure which results in lost motion or "play" between the cams and the members controlled thereby. For high-precision work with machines using cam-actuated cross slides, it is essential that there be a minimum of play in the linkage between the cam and slide. This is necessary so that the impetus imparted to the slide by its cam will be transmitted to the workpiece without loss of motion. Any loss of motion between the cams and the slides results in a mismatch of the rectangular components previously programmed onto the pair of cams.

Also, apart from any lost motion problems, it is important that there be precise phasing of the movements of the two cams such that the resultant displacement of the slides will generate the exact desired line or curve. These requisites have created problems in conventional machines in which it is not possible to vary the phase relationship between the cams to a correct phase-shift between the slides. The phenomenon of lost motion present in conventional machines is the result of deformation occurring in intermediate linkages imposed between the cams and the slides. It has been found that when a cam follower and a slide receive motion in the same plane, and ideally coaxially of one another, deflection and lost motion in the slide drive mechanism are obviated.

This invention solves the above problems by providing an improved structure wherein the components of motion generated by rotation of a cam are transmitted directly and without loss of motion to the slides of a modular attachment for converting a machine tool to a contouring tool.

Generally speaking, the invention resides in attachment apparatus for converting a machine tool into a contouring machine. The machine tool is characterized as having a workpiece holder, a tool holder adapted for engaging a tool, and means for imposing relative motion between the workpiece holder and the tool holder. The attachment apparatus has a base which is rigidly and fixedly engageable with the machine tool. A carriage and cross slide are movably mounted on the base. Carriage and cross slide drive means operable to impart rectilinear movement to the carriage and to the cross slide are provided. The movements of the carriage and the cross slide are relative to the base in perpendicular directions substantially parallel to the base. The drive means includes first and second cams which are rotatable about a common axis in planes which are parallel to the directions of movement of the carriage and cross slide. First and second cam followers are also included in the drive means. The first cam and the first follower are mounted between the base and the carriage. The first cam follower is fixed adjacent the first cam and engages the first cam at a point which lies on a line passing through the axis, the line also being parallel to the direction of rectilinear movement of the carriage. A second cam follower is rigidly mounted to the cross slide and is engageable with the second cam at a point which lies on a line passing through the axis, the line being parallel to the direction of movement of the cross slide. The attachment apparatus further includes means in the base operatively connected to the carriage and cross slide drive means for rotating the cams.

In a preferred form of the invention the carriage and cross slide drive means includes a camshaft rotatably journalled in the carriage and having an axis of rotation mutully perpendicular to the directions of rectilinear movement of the carriage and the cross slide. A rotatable drive shaft is mounted in the base and has its axis of rotation disposed parallel to the direction of rectilinear movement of the carriage. Camshaft drive means are operatively connected between the camshaft and the drive shaft for rotating the camshaft in response to rotation of the drive shaft. The cam shaft drive means are adapted to accommodate movement of the carriage relative to the base and to provide a constant speed ratio between the camshaft and the drive shaft at any position of the carriage relative to the base. Means are provided to bias the cams and the followers into engagement.

The apparatus of the present invention, in a preferred form thereof, further comprises means for interconnecting the drive shaft with drive means of the machine tool so that movement of the camshaft is synchronous with rotatable means on the machine tool driven by the machine tool drive means, the rotatable means on the machine tool being adapted to receive either a workpiece or a tool.

The above-mentioned and other features of the invention are more fully set forth in the following detailed description of the invention taken in conjunction with the accompanying drawings in which:

FIG. 1 is an elevation view of a modular attachment according to the present invention and mounted to a lathe which represents an illustrative environment of the attachment module;

FIG. 2 is a cross-section elevation taken along line II—II of FIG. 1 showing an interconnection between the machine tool drive mechanism and the module drive mechanism;

FIG. 3 is a cross-section elevation taken along line III—III of FIG. 1;

FIG. 4 is an enlarged cross-section elevation of the module taken along line IV—IV of FIG. 6;

FIG. 5 is a composite cross-section elevation taken along stepped cross-section line V—V of FIG. 6;

FIG. 6 is a top plan view of the module, with parts broken away, showing the camshaft drive means and the carriage and cross slide biasing means;

Figure 7:
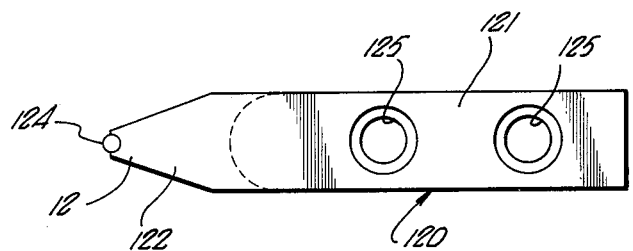
FIG. 7 is an enlarged plan view of a cam follower according to the present invention.

Referring initially to FIG. 1, a module or attachment apparatus 10 according to the present invention is shown mounted to a lathe 11. The lathe has a horizontal bed 12 defining a pair of horizontally spaced apart parallel ways, slides or guide rails 13 and 14 extending laterally from a drive housing 15. Within housing 15 is mounted a drive mechanism for rotating a headstock 16 and a feed screw 17 which extends along the front of the bed to a tailstock end 18 of the lathe. As originally provided, the lathe has a tailstock which is slidably mounted on slide ways 13 and 14, but which has been removed to accommodate module 10. As illustrated, headstock 16 is fitted with jaw-type chuck 19 for mounting a workpiece 20 to the headstock for rotation with the headstock. The jaw-type chuck has been shown merely for the purposes of illustration and it is within the scope of the present invention that any acceptable means, such as a Jacobs compressible collar chuck mechanism, may be fitted to headstock 16 to secure the workpiece.

Lathe 11 has been illustrated in FIG. 1 merely for the purposes of showing an exemplary environment within which module 10 has utility. Substantially any machine tool may be converted to a contouring machine by addition of a modular attachment incorporating the features of this invention. The machine tool to which the module is attached may be described generally as having a movable workpiece holder, first support means for the workpiece holder, a tool holder, second support means for the tool holder, and means for effecting relative motion between the tool and a workpiece engaged within the workpiece holder. The nature of the means for effecting relative motion, and the nature of the relative motion effected, is dependent upon the type of machine tool to which the module is attached. For this reason, the nature of work capable of being performed by the machine tool converted by addition of module 10 is, of course, partially dependent upon the manner in which the module is mounted to the machine tool. Other aspects of the work performed are determined by the nature of the curve programmed into the cams of the module.

As shown generally in FIGS. 1 and 2 and 3, module 10 has a base 40, a carriage or longitudinal slide 75 and a cross slide or upper member 140. The longitudinal slide is mounted for rectilinear movement relative to the carriage, while the cross slide is mounted to the longitudinal slide for rectilinear movement relative to the longitudinal slide in a direction at right angles to the direction of rectilinear movement of the longitudinal slide. A tool holder 22 is mounted to the cross-slide and secures a tool 23 which is positioned for working an exposed surface 24 of workpiece 20 as the rectilinear movements of the longitudinal and cross slides combine to trace a desired curve while the workpiece rotates with headstock 16.

The mechanism whereby the carriage and the cross slide move in their respective rectilinear movements will be described in detail below. In the environment of module 10 illustrated in FIG. 1, however, this mechanism is powered from the drive mechanism of the lathe contained in housing 15. The lathe may include a speed shifting mechanism within housing 15 for varying the speed of rotation of feed screw 17 with respect to the speed of rotation of headstock 16. Feed screw 17 is rotatably mounted between the lathe drive housing and a support at the tailstock end of the lathe. As shown, a housing 25 encloses a tailstock end of lathe bed 12. A pulley or drive wheel 26, adapted to receive a V-belt or chain drive loop 27, is mounted to feed screw 17 for rotation therewith within housing 25. Drive loop 27 is engaged between pulley 26 and a second pulley 28 which is secured for rotation with shaft 29. Shaft 29 is disposed between rails 13 and 14 and preferably lies in a horizontal plane with its axis of rotation parallel to the axis of rotation of lathe feed screw 17. Shaft 29 extends toward lathe drive housing 15 from the tailstock housing to adjacent the module base where a pulley 30 (FIGS. 3 and 6) is secured to the shaft. Pulley 30 receives a drive loop 31 which is engaged with an input pulley or wheel 32 secured to an input shaft 33 of a speed change mechanism 34. A second drive loop 35 is secured between an output drive wheel 36 of the speed change mechanism and a drive wheel 37 secured to a spline shaft 38 rotatably mounted within base 40 of module 10. As illustrated in the drawings, spline shaft 38 is mounted coaxially with drive shaft 29; shafts 29 and 38 are discontinuous in the vicinity of wheels 30 and 37. Speed change mechanism 34 is mounted to a bracket or platform 39 secured to side 47 of module base 40.

In the apparatus illustrated and described above, module 10 is operatively powered from the lathe drive mechanism within housing 15 by a power take-off from lathe feed screw 17. Rotation of the spline shaft is synchronous with the rotation of the feed screw. It is within the scope of the present invention, however, that the module may be operated by its own power supply which, in a preferred case, would take the form of an electric motor preferably mounted on platform 39. It is also within the scope of the present invention that module 10 be synchronously driven from the machine tool drive mechanism without the interposition of a speed change mechanism between the machine tool and module spline shaft 38. This latter case is especially practical when the module is associated with a lathe having speed reduction mechanisms between the headstock and the feed screw. Whether or not the module is operated by its own power source or by a power take-off from the machine tool is often determined by the character of the machine tool with which the module is used.

In FIG. 1, tool 23 is illustrated as being secured for movement relative to the lathe by mounting the tool upon the cross slide of module 10; the workpiece with which tool 23 is engaged is shown to be mounted to the machine tool. It is within the scope of this invention, however, that the workpiece be mounted to the module while the tool is secured to the machine tool as may be the case when the module is used in conjunction with a drill press or milling machine. Module 10 includes a base member or mounting plate 40 which is fitted for rigid engagement with the bed or other appropriate structure of the machine tool. As illustrated in FIGS. 1 and 3, the base has a depending lug 41 at each corner thereof which engages the underside of the portion of the lathe bed which defines rails 13 and 14. Additionally, the base member has angularly disposed surfaces 42 and 43 adjacent its forward end rear edges 44 and 45 which mate with the bearing surfaces of the lathe rails. The described structure is provided as shown in the drawings to adapt the module base to the particular machine tool; where the structure of the machine tool varies from that of the lathe illustrated, the invention encompasses suitable modifications to the structure of base member 40 to secure the base member rigidly to corresponding structure of a different machine tool.

The module base member is of substantially rectangular plan outline and has spaced apart forward and rear sides 44 and 45 and longitudinal sides 46 and 47.

The base member also has a planar, preferably horizontal, upper surface 48. An aperture 49 is provided vertically through the extent of the base member; in a preferred form of the invention, aperture 49 is disposed substantially midway between forward and rear edges 44, 45 and closer to left side edge 46 than to right edge 47 (see FIG. 6). Aperture 49 has a forward limit or edge 50 disposed forwardly of spline shaft 38. Bearing means for the longitudinal slide or carriage are secured to base member 40 along the forward and rear edges of the base. As shown in FIG. 4, the bearing means in a preferred form of the invention are ball bearing guides each having a base race portion 51 secured to base member 40 by a plurality of bolts 52, and a carriage race portion 53 secured to the underside of carriage 75 adjacent the forward and rear edges thereof by a plurality of bolts 54. It is within the scope of this invention, that any satisfactory bearing and guiding means may be provided to guide the direction of rectilinear movement of the carriage relative to the base member; such an alternate bearing means may be of the type commercially available under the designation SKF-BR9.

As illustrated in FIG. 6, a cylinder 57 having a horizontal axis is formed within base member 40 parallel to the forward and rear edges thereof and opening into the right edge of the base. An elongated aperture 58 is provided through base member 40 in line with each cylinder 57 at the end of the cylinder opposite from base side 47. A piston 59 is disposed within each cylinder 57 and has a piston rod 60 extending from the piston into aperture 58 by passage through a reduced diameter portion 61 in the base member between the cylinder and aperture 58, a connecting pin 62 which depends from the underside of the module carriage is connected to the piston rod within aperture 58. Each piston and cylinder assembly is provided as a biasing means for urging the cam follower associated with the base into engagement with the cam which controls the reciprocal motion of the carriage relative to the base. Accordingly, motive fluid is supplied to each cylinder 57 to urge the piston therein toward the right side of the base to urge cam 99 toward fixed follower 120.

A motive fluid manifold 63 is secured to the base member so as to close each cylinder where the cylinder opens into the right side wall of the base member. Each manifold 63 has an inlet duct 64 and an outlet duct 65 connected with the left and right sides of piston 59, respectively. Ducts 64 and 65 of one manifold are connected to the corresponding ducts in the other manifold by ducting 66, as shown in FIG. 6. Motive power is supplied to the manifolds by a motive fluid supply duct 67 and a motive fluid return duct 68 connected to one of the manifolds and interconnected with the ducts 64 and 65 therein. The motive fluid may be a hydraulic fluid or compressed air and is supplied to ducts 67 and 68 in response to actuation of valve means (not shown) to urge the piston 59 toward manifolds 63. The source of the motive fluid supplied to the manifold through ducts 67 and 68 is removed from the module and does not comprise a portion of this invention; in many instances the source of motive fluid may be provided in a machine tool to which the module is attached.

An alternate form of cylinder assembly is illustrated in FIG. 5. Rather than being defined integrally within base member 40, each cylinder of the carriage bias means is provided by a sleeve 69 which is sealed relative to its corresponding manifold 63 by an O-ring. Each sleeve 69 has an annularly bored closure member 70 at its end opposite from manifold 63. The piston rod associated with piston 59 passes through the annular bore of the closure member 70 to be connected to the depending end of connecting pin 62 which is secured to the carriage.

A carriage or longitudinal slide 75 is slidably mounted to base member 40 for reciprocal movement relative to the base member in a direction determined by the guide means 52, 54 along the front and rear edges of the base member. The carriage has a forward edge 76, a rear edge 77, a left side 78 and a right side 79 defining a rectangular, substantially planar member of the module. Carriage guide races 54 are mounted to the underside of the carriage along the forward and rear edges to mate with base member race elements 52 secured to the base member. A dirt strip or wiper element 80 is secured to each of the transverse sides of the carriage to engage base member upper surface 48 during movement of the carriage relative to the base member and assure that foreign particles, such as cuttings from the workpiece, do not enter into the space between the underside of the carriage and the upper surface of the base member to foul the moving parts of the cam drive mechanism. Manifolds 63 are recessed at 81 to accommodate the wiping strips and to provide a stop for the carriage at its maximum limit of travel relative to the base member.

The carriage has an upper surface 83 which is recessed centrally of the carriage to define a circular well 84 having a bottom surface 85, a depending boss or bearing support sleeve 86 is extended from the lower side of the carriage centrally of well 84. Boss 86 has a conical bore 87 which tapers as it extends from well 84 and which has an enlarged diameter portion 88 adjacent well 84. A camshaft bearing sleeve 89, having a cylindrical center bore 90, is fitted within the bore of boss 86 and mates with the taper of the boss bore. Sleeve 89 preferably is fabricated from a bearing metal such as Phosphor bronze and has a peripheral flange 91 at its upper end engaged within enlarged diameter portion 88 of bore 87. The upper end of sleeve 89 is positioned above the lower surface of well 84 and serves as a thrust bearing for cams secured to a camshaft 93 rotatably journalled within the bearing sleeve. The structure of the camshaft mounting described above is according to a preferred environment of the invention, but it is within the scope of the present invention that alternate bearing structures for the camshaft may be provided.

The camshaft has a major diameter portion within bore 90 which is slightly longer than the length of bearing sleeve 89. A first reduced diameter portion 94 of camshaft 93 depends from a lower end of the camshaft. A second reduced diameter portion 95 extends coaxially of camshaft 93 from the major diameter portion and has a longitudinal keyway 96 provided therein to secure the control cams relative to the camshaft. A threaded nipple extends upwardly from the second reduced diameter portion of camshaft 93 to receive a nut 97.

First and second control cams 99 and 100, having a thin spacer washer 101 therebetween, are secured concentrically of the second reduced diameter portion of camshaft 93 and nut 97. The first control cam 99 is the carriage control cam and is engaged with the upper end of the bearing sleeve 89 and with the shoulder formed between the major diameter portion of the camshaft and the second reduced diameter portion. Each of the control cams is substantially planar and have cylindrical control surfaces 102 and 103, respectively. The distance from the axis of rotation of the camshaft to selected elements of the cylindrical control surfaces varies along the circumference of each cam, the nature of this variation being a function of the X or Y coordinates programmed into the particular cam. The X and Y coordinates are derived from the preselected curve which the combined movements of the carriage and cross slide reproduce in response to movements imparted thereto by the cams.

It has been stated that each of the cams has a cylindrical control surface defining the periphery of each cam. The term "cylindrical" is used in its mathematical sense and does not necessarily refer to a circularly cylindrical geometrical shape. The mathematical definition of a cylinder is that surface generated in space by a line (the generatrix) moving at all times parallel to a second straight line (the directrix).

A camshaft drive gear means 105 is secured to the camshaft and is operatively engaged with cooperating drive means mounted to spline shaft 38. In a preferred form of the invention, illustrated in FIG. 4, the camshaft drive means is in the form of a gear having a planar body 106 centered concentric to the axis of rotation of camshaft 93 by engagement with the first reduced diameter portion 94. A circumferential flange 107 extends upwardly from the horizontal body of gear 105 and mounts on its outer circumference gear teeth 108. As shown in FIG. 4, boss 86 and toothed gear 105 are disposed concentric to one another within the extent of aperture 50 of base member 40. This geometrical configuration provides that the bearings for the camshaft have a maximum length consistent with a minimum depth of module 10. It is desired that the axial journalling engagement between bearing sleeve 89 and the camshaft be as great as possible to minimize any tendency of the camshaft to move from a vertically aligned position. Any such movement of the axis of the camshaft from a vertical line will result in play within the moving parts of the module and will, accordingly, lead to inaccurate reconstruction of the preselected curve.

The teeth of camshaft gear 105 are engaged with a worm gear mounted by means of a spline-type connection to spline shaft 38. As shown in FIGS. 4 and 5, a cantilevered end of spline shaft 38 is disposed within the aperture 50 in the module base member and is provided with a plurality of straight parallel flutes 111 which are engaged within a series of longitudinal recesses formed along the wall of an annular bore 112 extending axially through worm gear 110. The worm gear has a cylindrical sleeve portion 113 at each of its opposite ends; these sleeves are journalled within coaxially aligned bores of spaced apart lugs 114 depending from the underside of a carriage into base member aperture 50. Worm gear 110 is thus rotatably journalled to the carriage and in turn mounts the cantilevered end of the spline shaft in slidable engagement with the spline shaft, but the worm gear is secured from angular displacement relative to the spline shaft.

Carriage 75 moves reciprocably with respect to the base member of module 10. For this reason it is preferred that axis 51 of the spline shaft be aligned parallel with the direction of rectilinear movement of the carriage relative to the base member. It is within the scope of this invention, however, that the spline shaft may be oriented at an angle to the direction of rectilinear movement of the carriage and that an alternate linkage between the spline shaft and the camshaft be provided. Such an alternate linkage, however, should be such as to provide a constant speed ratio between the spline shaft and the camshaft regardless of the position of the carriage relative to the base.

A cut-out or base follower recess 116 is provided through the carriage between the camshaft and the right side of the carriage and preferably is symmetrical about a line passing through the axis of rotation of the camshaft and aligned parallel to the direction of rectilinear movement of the carriage. Cut-out 116 communicates with boss bore 87 at a location adjacent the axis of camshaft 93 in line with the direction of movement of the carriage. The cut-out has a width adjacent side 79 of the carriage which is substantially greater than the width of the cut-out adjacent camshaft 93. The tapering configuration of the cut-out, proceeding from right to left as viewed in FIG. 6, is to accommodate a cross slide biasing means connecting pin 117 depending from the cross slide. The general configuration of cut-out 116 in a preferred form of the invention is illustrated by dotted line 118 of FIG. 6.

Figure 8:
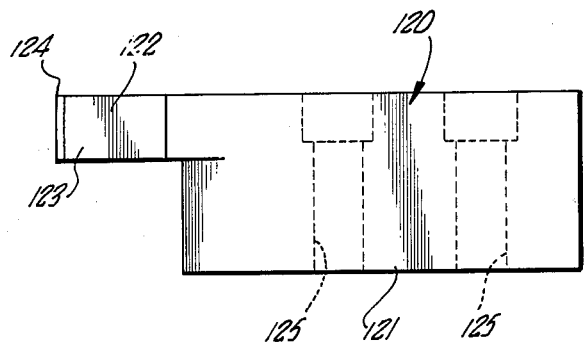
FIG. 8 is an elevation view of the cam follower shown in FIG. 7.

A cam follower 120 shown in greater detail in FIGS. 7 and 8, is mounted fixedly to the upper surface of module base member 40 adjacent base member aperture 50. The cam follower is aligned with the direction of rectilinear movement of carriage 75. Follower 120 has a substantially rectangular body 121 and a laterally extending finger 122 which tapers in a horizontal plane to an end 123 removed from body 121. In a preferred form of the invention, the cam follower is fabricated from mild steel. In order to provide for long life of the follower when engaged with rotating cam 99, an insert 124 of hard surfacing material, such as Haynes Stellite C, is secured to the end of finger 123 and is oriented vertically with respect to the cam follower. A pair of countersunk bolting holes 125 are provided through the body of the follower and have the countersunk portions thereof adjacent projecting finger 122. The follower is secured to module base 40 by a pair of bolts 126 having their heads engaged within the countersunk portions of bolting holes 125 to assure clearance between the base cam follower and cam 100.

A cross slide biasing cylinder 128 is provided within carriage 75 adjacent each of the rear corners of the carriage. Each cylinder has its axis disposed parallel to the direction of rectilinear movement of the cross slide relative to the carriage. A piston 129 and a piston rod 130 are disposed within each cylinder 128. The piston rod in the right cylinder of the carriage extends into the cut-out 116 to be connected to depending connecting pin 117 of the cross slide. The piston of the left cylinder extends into an aperture (not shown) in carriage 75 which is similar to aperture 58 provided through base member 40 and is therein connected to a second cross slide connecting pin. The details of construction of the cross slide biasing cylinders 128 may be either according to those associated with cylinder 57 or with sleeve 69 previously described.

A motive fluid inlet/outlet manifold 131, similar to manifold 63, is provided as a closure means for each of cylinders 128 where the cylinders open into the rear side 77 of the module carriage. A motive fluid supply duct 132 and a motive fluid return duct 133 are connected to one of the cross slide biasing means manifolds and extend therefrom to a source of fluid. The manifolds are connected together by ducts 134. It should be noted, however, that in the cross slide biasing means, the motive fluid is supplied to the side of piston 129 which is opposite from the conecting pins 117 so that cam follower 155, secured to the underside of the cross slide, is induced to move toward the axis of rotation of camshaft 93. This reversal of function with respect to the biasing means for carriage 75 is necessary since the camshaft is rotatably journalled within the carriage and moves with the carriage.

Cross slide guide means 135 (see FIG. 5) are mounted between the carriage and the cross slide of module 10. In a preferred form of the invention, illustrated, guide means 135 are of the type provided between the base member and the carriage. The cross slide guide means includes a carriage mounted ball bearing race 136 aligned immediately adjacent to the longitudinal sides 78 and 79 of the carriage and secured to the carriage by a plurality of bolts 137. A cross slide mounted race 138 depends from each side of the cross slide and lies inboard of the cooperating carriage mounted race 136 within a recess 139.

Module 10 includes a cross slide 140 mounted to carriage 75 by means of carriage bearing and guide means 135 for rectilinear movement in a direction at right angles to the direction of rectilinear movement of the carriage. The cross slide has a front edge 141, a rear edge or side 142, left and right sides 143 and 144, and has a flat upper surface 145 preferably disposed perpendicular to the axis of rotation of the camshaft. In a preferred form of the invention, the width of the cross slide between sides 143 and 144 is equal to the width of the carriage, but the transverse dimension between sides 141 and 142 is less than the corresponding dimension of the carriage. A dirt shield or wiper strip 147, similar to wiper strip 80 associated with the carriage, is secured to the cross slide along the entire extents of the forward and rear sides and engages the carriage to prevent foreign particles from entering into the camshaft drive and follower mechanisms within the module.

A circular aperture 148 is provided through the cross slide. The aperture has an enlarged diameter portion 149 adjacent the upper surface of the cross slide. A cover plate 150 of circular configuration adapted to mate with the recessed aperture is engaged within cross slide aperture 148 and is secured in fixed position by a plurality of bolts 151 which pass through the cover around the periphery of the cover to engage the cross slide. The upper surface of the cross slide and the cover plate is provided with a plurality of parallel inverted T-grooves 152 which extend at uniformly spaced apart intervals competely transversely of the cross slide. Grooves 152 are provided so that a tool holder, such as tool holder 22 illustrated in FIG. 1, or a plurality of workpiece holding dogs may be engaged with the cross slide to move along the preselected curve which has its rectangular coordinates programmed into the control surfaces of cams 99 and 100.

A cam follower 155 is secured to the underside of cover plate 150 by a pair of bolts 156 engaged in countersunk holes 157 in the cover plate. The bolts are threadedly engaged in tapped holes 158 in follower 155. Except for the fact that the holes in follower 155 are tapped, follower 155 is identical to follower 120 illustrated in FIGS. 7 and 8 and the hard-face, laterally extending finger of the follower extends from the lower portion of the follower rather than from the upper portion as in follower 120. Cross slide cam follower 155 is secured fixedly to the cover plate, and, accordingly, fixedly to the cross slide when the cover plate is engaged with the cross slide, so as to have with the point of engagement between the cross slide cam follower and cam 100 lying on a line which passes through the axis of rotation of the camshaft and which is parallel to the direction of rectilinear movement of the cross slide.

A feature of this invention resides in the provision of a cover plate in the cross slide so that the control cams mounted to camshaft 93 are accessible from the top of module 10. This feature of the invention results in convenient interchangeability of the program cams when it is desired to have the module reproduce a different preselected curve.

In the exemplary environment of the invention illustrated in FIG. 1, carriage 75 is mounted to the bed of lathe 11 so that its direction of rectilinear movement is parallel to the axis of rotation of headstock 16. It is not required, however, that the direction of rectilinear movement of either the cross slide of the carriage be parallel to the axis of rotation of the headstock or similar element of a different machine tool to which the module is applied. In the case of a drill press, for example, the axis of rotation of the drill chuck may be perpendicular to the directions of rectilinear movement of both the carriage and the cross slide. In the case of a horizontal boring mill, for example, the directions of rectilinear movement of the components of the module may be skew to the axis of rotation of the chuck of the boring mill.

In the apparatus illustrated in the drawings and described above, the transfer of motion from the cams to the cam followers is direct, i.e., there are no intermediate movable linkage interposed between the cams and the elements to be moved by the cams. This elimination of intermediate elements eliminates the major cause of lost motion in cam controlled machine tools. By having the point of engagement of each cam with its cam follower lying on a line passing through the axis of rotation of the camshaft parallel to the direction of rectilinear movement of the part regulated by that cam, deflection of the components of the apparatus of the invention is minimized to further reduce lost motion or play between the elements of the module. Both of these features contribute to providing a cam controlled attachment module which precisely reproduces a preselected curve having rectilinear coordinates programmed into the peripheries of the cams of the module.

While the transfer of motion from the cams to the carriage and cross slide is direct, it is a feature of this invention that the preselected curve programmed into the cams may be reproduced by a discontinuous cycle. For example, assume that a rod-shaped workpiece is secured in chuck 19 of the headstock of lathe 11 with the axis of the stock or workpiece being disposed concentric to the axis of rotation of the headstock. Further, assume that it is desired to machine a predetermined contour into the cylindrical surface of the workpiece. In such a case the preselected curve programmed into the control surfaces of the cams is disposed generally parallel to the axis of rotation of headstock 16 and corresponds to the contour. The preselected curve may have a segment which is disposed perpendicular to the axis of rotation of the workpiece and defines a shoulder which, for example, opens to the unsupported end of the workpiece remote from headstock 16.

Where the preselected curve is reproduced by a stylus-type tracer in which the stylus follows either along a template into which the presselected curve is cut or over the surface of a master, the curve is reproduced continuously by the tool. That is, the stylus beings at one end of the curve and follows along the master or template to the other end of the curve without interruption. If it is assumed that the preselected curve has its point of origin at the free or sunsupported end of the workpiece, the tool will move along the shoulder from the inner radius to the outer radius of the shoulder. In such a case, the tool may chatter as it moves along the shoulder, particularly if the tool has a straight cutting edge disposed perpendicularly of the axis of rotation of the workpiece because the straight edge is engaged in cutting relation across the entire radial extent of the shoulder. Alternatively, the tool may be angled toward the shoulder such that only a point contact between the tool and workpiece is had; even so, as the tool moves away from the axis of rotation of the workpiece along the straight segment, the cut may be too deep and chatter would result as the tool pulls into the workpiece.

The present invention provides that the preselected curve may be reproduced discontinuously. If it is assumed that the preselected curve has at least adjacent two segments (the first segment corresponding to the finished contour of the workpiece between the unsupported end and the shoulder, and the second segment corresponding to the radial face of the shoulder), it is clear that these segments intersect at a common point. The cams may be programmed so that the toal moves along the first segment from the point of origin of the preselected curve to the common point. After the tool arrives at the common point, the cams instruct the carriage and cross slide to move such that the tool is withdrawn from the common point and is moved to the opposite end of the second segment. The tool then moves along the segment of the preselected curve toward the common point. In this manner the tool automatically follows the same patterns of motion which the tool would follow if the apparatus were regulated manually. If desired, the cams may be programmed so that the tool then commences movment along a third segment abutting the second segment in a direction substantially parallel to the direction in which the tool moved along the first segment.

Because the present invention is capable of reproducing a preselected curve in a discontinuous manner, it is also a feature of this invention that a plurality of tools may be secured to the cross slide and moved into engagement with the workpiece according to a predetermined schedule. For example, the first tool may trace along the preselected curve to shape the workpiece as desired, and then the second tool, which may be a knurling tool, may be engaged with a portion of the workpiece to knurl a predetermined portion of the workpiece.

The foregoing description and explanation of the invention has been made in conjunction with specific apparatus and specified configurations merely by way of example, and such description should not be considered as limiting the scope of this invention.

What is claimed is:

1. Contouring apparatus for use with a machine tool having a chuck or the like adapted to hold one of a workpiece and a cutting tool, the apparatus being adapted to carry the other of a workpiece and a cutting tool and comprising a base rigidly and fixedly engageable with the machine tool, a carriage movably mounted on the base, a cross slide movably mounted on the carriage and adapted to carry said other one of the workpiece and the cutting tool, drive means mounted to the carriage for imparting rectilinear movement to the carriage and to the cross slide relative to the base in perpendicular directions substantially parallel to the base, the drive means including first and second cams rotatable about an axis in planes parallel to the directions of rectilinear movement of the carriage and cross slide, a first cam follower rigidly mounted to the base and engageable with the first cam at a point lying on a line passing through the axis parallel to the direction of rectilinear movement of the carriage, a second cam follower rigidly mounted to the cross slide and engageable with the second cam at a point lying on a line passing through the axis parallel to the direction of rectilinear movement of the cross slide, means for biasing the carriage and the cross slide to maintain the cams and the followers in operative engagement, and means in the base operatively connected to the drive means for rotating the cams.

2. Apparatus according to claim 1 wherein the drive means mounted to the carriage comprises a shaft rotatably journalled in the carriage, the cams being secured to the shaft for rotation with the shaft.

3. Apparatus according to claim 1 wherein the drive means mounted to the carriage comprises a camshaft journalled in the carriage for rotation about an axis mutually perpendicular to the directions of rectilinear movement of the carriage and the cross slide.

4. Apparatus according to claim 3 wherein the means in the base comprises a drive shaft rotatably mounted in the base for rotation about an axis parallel to the direction of rectilinear movement of the carriage.

5. Apparatus according to claim 4 including a gear secured to the cam shaft for rotation therewith, and a worm slidably mounted to the drive shaft for rotation with the drive shaft, the worm being engaged with the gear.

6. Apparatus according to claim 1 wherein the biasing means comprises a first cylinder in the base, a first piston slidably disposed in the first cylinder, a first piston rod connected to the first piston and extending from the first cylinder parallel to the direction of movement of the carriage, a carriage connecting pin rigidly secured to the carriage and connected to the first piston rod exteriorly of the first cylinder, a second cylinder, a second piston slidably disposed in the second cylinder, a second piston rod connected to the second piston and extending from the second cylinder parallel to the direction of movement of the cross slide, and a cross slide connecting pin rigidly secured to the cross slide and connected to the second piston rod exteriorly of the second cylinder.

7. Apparatus according to claim 6 including means for supplying motive fluid to the first and second cylinders to induce movement of the first and second pistons in preselected directions parallel to the directions of rectilinear movement of the carriage and cross slide, respectively.

8. Attachment apparatus for a machine tool having a bed, a workpiece holder, and means for moving the workpiece holder and a workpiece engaged therein relative to the bed, the attachment comprising a base member rigidly engageable with the bed, a carriage movably mounted on the base member for rectilinear movement thereof relative to the base member, a cross slide movably mounted on the carriage for rectilinear movement thereof relative to the carriage in a direction at right angles to the direction of rectilinear movement of the carriage, a camshaft on the carriage, bearing means for rotatably mounting the camshaft on the carriage with its axis of rotation at right angles mutually to the directions of rectilinear movement of the carriage and the cross slide, means for rotating the camshaft including a drive shaft rotatably mounted in the base member and having its axis of rotation perpendicular to but spaced from the camshaft axis, a gear having an annular bore disposed concentric to the drive shaft adjacent the camshaft, mounting means for slidably mounting the gear to the drive shaft and for securing the gear from angular displacement relative to the drive shaft, and gear means operatively engaged between the gear and the camshaft for rotation of the camshaft in response to rotation of the gear, first and second cams mounted to the camshaft for rotation therewith, each cam having a cylindrical control surface peripherally thereof, a first cam follower fixedly mounted to the base member and engaging the control surface of the first cam at a point lying on a line parallel to the direction of rectilinear movement of the carriage and passing through the axis of rotation of the camshaft, second cam follower means fixedly secured to the cross slide and engaging the control surface of the second cam at a point lying on a line parallel to the direction of rectilinear movement of the cross slide and passing through the axis of rotation of the camshaft, biasing means for maintaining engagement of the first follower with first control surface and of the second follower with the second cam control surface, and means for securing a tool to the cross slide for engagement with the workpiece.

9. Attachment apparatus according to claim 8 wherein each cam follower comprises a unitary block having a laterally extending finger tapering substantially to a point at an end removed from the block, and an insert of hard surfacing material mounted to the finger at said end, the hard surfacing material being engageable with the cylindrical control surface of the adjacent cam.

10. Modular apparatus for attachment to a machine tool comprising a base member having a substantially planar upper surface, an aperture through a central portion of the base member, a carriage having a substantially planar upper surface, means engaged between the base member and the carriage for movably mounting the carriage to the base member and for rectilinearly guiding movement of the carriage, a boss depending from the carriage into the base member aperture, a bore through the carriage and boss, an annular bearing sleeve disposed within the bore, a camshaft journalled in the bearing sleeve for rotation about an axis, the camshaft having a first end extending from the sleeve toward the carriage upper surface and a second end extending from the sleeve, a slide, means engaged between the slide and the carriage for movably mounting the slide to the carriage and for guiding the slide in rectilinear movement in a direction mutually at right angles to the axis of the camshaft and to the direction of rectilinear movement of the carriage, a first cam mounted to the first end of the camshaft for rotation therewith, a second cam mounted to the first end of the camshaft for rotation therewith, each cam having a periphery defining a cylindrical control surface, a first cam follower fixedly secured to the base upper surface and engaging the first cam control surface at a point lying on a line passing through the axis parallel to the direction of movement of the carriage, a second cam follower fixedly secured to the slide and engaging the second cam control surface at a point lying on a line passing through the axis parallel to the direction of movement of the slide, means for biasing the carriage and the cross slide to maintain the cams and the followers in operative engagement, each follower having a lateral finger having a hard surfaced tip engaging the respective cam at said point, a gear secured to the camshaft second end for rotation with the camshaft, a shaft mounted in the base for rotation about an axis parallel to the direction of movement of the carriage and having an end disposed in the base member aperture, a worm gear, a pair of spaced apart lugs depending from the carriage into the base member aperture transversely of the shaft axis and rotatably supporting the worm gear therebetween, means for mounting the worm gear to the end of the shaft so that the worm gear is slidable axially of the shaft but is secured from angullar motion relative to the shaft, the worm gear being engaged with the camshaft gear to transfer rotary motion of the shaft to the camshaft as the carriage moves rectilinearly relative to the shaft, and means for rotating the shaft.

11. Contouring apparatus for use with a machine tool having a chuck or the like adapted to hold one of a workpiece and a cutting tool, the apparatus being adapted to carry the other of a workpiece and a cutting tool and comprising a base rigidly and fixedly engageable with the machine tool, a carriage movably mounted on the base, a cross slide movably mounted on the carriage and adapted to carry said other one of the workpiece and the cutting tool, drive means operable to impart rectilinear movement to the carriage and to the cross slide relative to the base in perpendicular directions substantially parallel to the base, the drive means including first and second cams rotatable about an axis in planes parallel to the directions of rectilinear movement of the carriage and cross slide, first and second cam followers, the first cam and first follower being mounted between the base and the carriage, the first cam follower being fixed adjacent the first cam and engaging the first cam at a point lying on a line passing through the axis parallel to the direction of rectilinear movement of the carriage, the second cam follower being rigidly mounted to the cross slide and engaging the second cam at a point lying on a line passing through the axis parallel to the direction of rectilinear movement of the cross slide, means for biasing the carriage and the cross slide to maintain the cams and the followers in operative engagement, and means in the base operatively connected to the drive means operable to rotate the cams.

12. Contouring apparatus adapted for use with a machine tool having a chuck adapted to hold one of a workpiece and a cutting tool, the apparatus being adapted to carry the other of a workpiece and a cutting tool and comprising a base member rigidly engageable with the machine tool adjacent the chuck, a carriage movably mounted on the base member for rectilinear movement thereof relative to the base member, a cross slide movably mounted on the carriage for rectilinear movement thereof relative to the carriage in a direction at right angles to the direction of rectilinear movement of the carriage, a camshaft mounted to the carriage for rotation about an axis at right angles mutually to the directions of rectilinear movement of the carriage and the cross slide, drive means operably connected to the camshaft for rotating the camshaft and operable irrespective of the position of the carriage relative to the base member, first and second cams mounted to the camshaft for rotation therewith, each cam having a cylindrical control surface peripherally thereof, a first cam follower fixedly mounted to the base member and engaging the control surface of the first cam at a point lying on a line parallel to the direction of rectilinear movement of the carriage and passing through the axis of the camshaft, a second cam follower fixedly secured to the cross slide for engaging the control surface of the second cam at a point lying on a line parallel to the direction of rectilinear movement of the cross slide and passing through the axis of the camshaft, biasing means for maintaining engagement of the cam followers with their respective cams, and means for securing said other one of a workpiece and a tool to the cross slide.

13. In combination with a lathe having a rotatable chuck adapted for releasably mounting a workpiece for rotation about the chuck axis of rotation, a lathe bed defining a pair of spaced slide ways extending parallel to said chuck axis, and a feed screw operatively connected to the chuck for rotation synchronously therewith, apparatus for converting the lathe to a contouring machine comprising a base rigidly and fixedly engaged with the lathe bed on the slide ways thereof adjacent the chuck, a carriage movably mounted on the base, a cross slide movably mounted on the carriage and adapted to carry a cutting tool, a drive means mounted to the carriage for imparting rectilinear movement to the carriage and to the cross slide relative to the base in perpendicular directions substantially parallel to the base, the drive means including first and second cams rotatable about an axis in planes parallel to the direction of rectilinear movement of the carriage and cross slide, a first cam follower rigidly mounted to the base and engageable with the first cam at a point lying on a line passing through the axis parallel to the direction of rectilinear movement of the carriage, a second cam follower rigidly mounted to the cross slide and engageable with the second cam at a point lying on a line passing through the axis parallel to the direction of rectilinear movement of the cross slide, means for biasing the carriage and the cross slide to maintain the cams and the followers in operative engagement, a shaft rotatably mounted in the base and operatively coupled to the carriage and to the cams for rotating the cams synchronously with rotation of the shaft, and means coupling the shaft to the feed screw for rotation of the shaft synchronously with rotation of the feed screw.

References Cited by the Examiner

UNITED STATES PATENTS

| | | | |
|---|---|---|---|
| 2,140,949 | 12/38 | Bickel | 82—19 |
| 2,872,853 | 2/59 | Hoern | 90—13 X |
| 3,066,561 | 12/62 | Auerbach | 82—19 |

WILLIAM W. DYER, JR., *Primary Examiner.*